US012334521B2

(12) United States Patent
Burchardt

(10) Patent No.: US 12,334,521 B2
(45) Date of Patent: Jun. 17, 2025

(54) SYSTEM AND METHOD FOR REUSING AN ELECTRIC VEHICLE BATTERY

(71) Applicant: ECO STOR AS, Oslo (NO)

(72) Inventor: Trygve Burchardt, Howell, MI (US)

(73) Assignee: ECO STOR AS, Oslo (NO)

( * ) Notice: Subject to any disclaimer, the term of this patent is extended or adjusted under 35 U.S.C. 154(b) by 669 days.

(21) Appl. No.: 17/580,294

(22) Filed: Jan. 20, 2022

(65) Prior Publication Data

US 2022/0149451 A1   May 12, 2022

Related U.S. Application Data

(63) Continuation of application No. PCT/IB2020/056862, filed on Jul. 22, 2020.

(Continued)

(51) Int. Cl.
*H01M 10/54* (2006.01)
*H01M 10/42* (2006.01)

(52) U.S. Cl.
CPC ....... *H01M 10/54* (2013.01); *H01M 10/4257* (2013.01); *H01M 2010/4271* (2013.01); *H01M 2220/20* (2013.01)

(58) Field of Classification Search
CPC ...... H02J 2310/48; H02J 3/381; H02J 7/0013; H02J 7/0029; H02J 2300/24; H02J 2310/60; H02J 7/0048; H02J 3/003; H02J 3/14; H02J 3/322; H02J 7/0031; H02J 7/02; H02J 7/0063; H02J 7/1423; H02J 7/342; H02J 3/32; H02J 7/0045; H02J 13/00002;

(Continued)

(56) References Cited

U.S. PATENT DOCUMENTS

| 2013/0090872 | A1* | 4/2013 | Kurimoto | B60L 58/13 |
| | | | | 702/63 |
| 2017/0106760 | A1* | 4/2017 | Wang | B60L 58/12 |

(Continued)

FOREIGN PATENT DOCUMENTS

| EP | 1 786 057 | 5/2007 |
| EP | 3 059 113 | 8/2016 |
| WO | WO-2013/143165 | 10/2013 |

OTHER PUBLICATIONS

International Search Report and Written Opinion in PCT/IB2020/056862 dated Oct. 2, 2020.

*Primary Examiner* — Binh C Tat
(74) *Attorney, Agent, or Firm* — Foley & Lardner LLP

(57) ABSTRACT

A device for enabling the reuse of a complete battery pack for electric vehicles (EV) is disclosed. The device allows reuse of a battery pack at a significantly lower cost than alternative methods that require the battery pack to be opened, batteries to be taken out and installed in a new pack with a new battery monitoring system (BMS), and undergoing certification as a new system. The disclosed device includes a controller having a software program operating therein and which is electrically coupled to a battery pack and provides electrical input and output signals to the BMS of the EV battery, which relate to optimal operating parameters of the battery pack including depth of discharge (DoD), depth of charge (DoC), charge rate, and temperature. The controller enables reuse of the complete battery pack without reopening and mimics electrical signaling compared to a car or other electric vehicles.

20 Claims, 7 Drawing Sheets

Related U.S. Application Data

(60) Provisional application No. 62/876,876, filed on Jul. 22, 2019.

(58) Field of Classification Search
CPC ............... H02J 2207/40; H02J 2310/12; H02J 2310/14; H02J 2310/64; H02J 3/30; H02J 3/38; H02J 7/00032; H02J 7/0016; H02J 7/0024; H02J 7/0047; H02J 7/0068; H02J 7/007; H02J 7/24; H02J 7/345; H02J 7/35; H02J 13/00001; H02J 2300/20; H02J 2310/16; H02J 2310/56; H02J 3/008; H02J 7/00034; H02J 7/0025; H02J 9/06; H02J 1/082; H02J 2207/20; H02J 2310/44; H02J 7/00304; H02J 7/007182; H02J 7/007194; H02J 7/14; H02J 7/1438; H02J 13/00024; H02J 2207/50; H02J 2300/00; H02J 2300/22; H02J 2310/40; H02J 3/00; H02J 3/007; H02J 3/144; H02J 3/388; H02J 7/00036; H02J 7/00041; H02J 7/00047; H02J 7/0019; H02J 7/00309; H02J 7/00712; H02J 7/1446; H02J 7/36; H02J 9/04; H02J 9/061; H01M 2220/20; H01M 10/425; H01M 2010/4271; H01M 10/441; H01M 10/48; H01M 10/4207; H01M 10/4257; H01M 10/482; H01M 2010/4278; H01M 10/46; H01M 10/625; H01M 50/213; H01M 50/249; H01M 50/51; H01M 10/00; H01M 10/02; H01M 10/052; H01M 10/0525; H01M 10/44; H01M 10/486; H01M 10/63; H01M 50/244; H01M 50/269; H01M 50/296; H01M 50/505; H01M 50/512; H01M 50/569; H01M 10/42; H01M 10/4221; H01M 10/4264; H01M 10/54; H01M 10/613; H01M 16/00; H01M 50/143; H01M 50/258; H01M 50/271; H01M 50/284; H01M 50/358; H01M 50/509; H01M 50/514; H01M 50/519; H01M 50/547
USPC .................................................. 320/108–115
See application file for complete search history.

(56) References Cited

U.S. PATENT DOCUMENTS

2017/0129361 A1\* 5/2017 Scaringe ................... H02J 7/14
2019/0027783 A1\* 1/2019 Matsushita ........... H01M 4/583

\* cited by examiner

SYSTEM AND METHOD FOR REUSING AN ELECTRIC VEHICLE BATTERY

CROSS-REFERENCE TO RELATED PATENT APPLICATIONS

This application claims the benefit and priority to U.S. Patent Application No. 62/876,876 filed Jul. 22, 2019, the entire disclosure of which is hereby incorporated by reference herein.

BACKGROUND

The present disclosure relates to a method for reusing an electric vehicle (EV) battery, and more particularly to a method for using an electric vehicle battery reclaimed from users by reconfiguring the management system of the battery without opening the case sealing the battery pack and battery monitoring system.

A used electric vehicle battery system (EV battery) often contains a large number of batteries or battery modules packaged into a hermetically sealed steel frame and connected together in parallel and/or in series to give a required output voltage and current. In addition, the EV battery system may include a battery management system (BMS) that monitors the performance of the batteries and ensures safe operations. To comply with automotive safety quality standards, a number of sensors are frequently included within the battery pack. Historical data such as temperature during charge and discharge, state of charge and state of discharge, cycle number, cell voltages etc. are all gathered during the automotive life of the battery and stored on the BMS.

Generally, reuse of EV batteries involves disassembling the batteries by opening the pack and removing the cells or modules. Removed cells or modules can then be sorted based on various parameters (e.g., voltages, capacities, and/or impedances), wherein the cells and modules having the most desirable parameters (e.g., based on predetermined benchmarks) are selected for reuse. Accordingly, for example, an end-of-life determination for a cell and/or module can be made when a parameter (e.g., resistance) associated with each unit cell or each battery module becomes greater than a specified value, or when a variation in parameters between unit cells or battery modules (e.g., remaining capacity or voltage) becomes greater than a specified value. Japanese Patent Publication No. JP 2003-017142 discloses a method for reusing a battery pack, where the method includes reclaiming a battery pack for replacement when it is determined that the battery pack has reached end of life, renewing unit cells or battery modules for which an end-of-life determination has been made by refilling them with an electrolytic solution, and reassembling them into a battery pack.

Another method, disclosed in Japanese Patent Publication No. JP 2007-141464, includes obtaining, from a secondary battery system, at least one or more pieces of battery information (i.e., selected from a resistance, a capacity, a battery use time, a resistance change rate, a capacity change rate, and a battery use intensity), determining if an obtained piece of battery information has reached a preset threshold value, reclaiming the secondary battery module upon determination that the threshold has been reached, grading the reclaimed secondary battery module based on its corresponding battery information, and applying the reclaimed secondary battery module to a system having threshold value conditions under which it can operate at the performance of the battery that the secondary battery module has at the time when it is being reclaimed.

Yet another example, provided in Japanese Patent Publication No. JP 2009-277627, discloses carrying out reconstruction to create a newly assembled battery by combining reusable secondary batteries of an originally recycled battery or another battery that is stored in a fully discharged state, or by combining the secondary battery to be reused and a new secondary battery.

The prior art shows that rebuilding a battery pack by taking out the cell or modules requires testing of the cells and modules and significant extra labor to correctly mix and match the cells or modules to secure good second life use. One of the main challenges with the rebuild approach to second life batteries is, therefore, related to cost. In addition to labor costs, the reused battery modules represent only about 50% of the complete system cost for an automotive EV battery. When the battery modules or cells are removed from the battery pack, sorted and rebuilt, a new BMS will have to be installed together with new wiring and a casing. In addition, the battery pack loses its certification when opened and requires re-certification and/or re-marking. The aforementioned steps associated with reusing batter modules add costs, with the resulting second life battery not significantly different compared to a newly built battery systems. Further, when opening batteries for sorting out the best modules, many require scraping. Due to the nature of the chemicals in the battery, the cells and/or modules from an opened battery pack are classified as dangerous waste and require safe storage, handling, and recycling—further increasing costs associated with second life batteries.

Accordingly, it would be advantageous to provide a system for reusing batteries and, particularly EV batteries, which is cost-effective, does not require chemical exposure through battery opening, and does not require reassembly of mixed and matched battery cells or modules.

SUMMARY

The foregoing summary is illustrative only and is not intended to be in any way limiting. In addition to the illustrative aspects, embodiments, and features described above, further aspects, embodiments, and features will become apparent by reference to the following drawings and the detailed description.

According to an exemplary embodiment of the present disclosure, a method for reusing an unopened electric vehicle battery within a second life battery system comprises receiving, by a central controller, a signal from a control unit coupled to an electric vehicle battery; processing, by a processor in communication with the central controller, the signal received from the control unit; determining, by the processor, a status of the electric vehicle battery based on the processed signal; determining, by the processor, a desired use application for the electric vehicle battery based on the status of the electric vehicle battery; determining, by the processor, an operating condition for the electric vehicle battery based on the desired use application; and sending, by the central controller, responsive to the determination of the operating condition, a first control signal to the control unit coupled to the electric vehicle battery; wherein the control signal causes the control unit to operate the electric vehicle battery based on the desired operating condition.

According to an exemplary embodiment, the method may further comprise sending, by the central controller, an activation signal to the electric vehicle battery via the control unit such that the electric vehicle battery is caused to change state.

According to an exemplary embodiment, the status may be based on a performance metric associated with the electric vehicle battery.

According to an exemplary embodiment, the performance metric may be based on a predetermined threshold corresponding to at least one of an impedance, efficiency, charge capacity, discharge capacity, voltage, or current associated with the electric vehicle battery.

According to an exemplary embodiment, the method may further comprise receiving, by the central controller, a load signal from a variable load coupled the central controller; and sending, by the central controller, a second control signal to the control unit coupled to the electric vehicle battery; wherein the second control signal causes the control unit to modify the operating condition of the electric vehicle battery.

According to an exemplary embodiment, the method may further comprise receiving, by the central controller, power from a coupled power source; and responsive to receiving power, deliver the power to the electric vehicle battery via the control unit.

Accordingly an exemplary embodiment, a second life battery system enabling reuse of unopened electric vehicle batteries comprises: an electric vehicle battery coupled to a control unit; and a central controller operably coupled to the electric vehicle battery via the control unit; The central controller may be configured to: receive a signal from the control unit; determine a status of the electric vehicle battery based on the received signal; determine a desired use application for the electric vehicle battery based on the status of the electric vehicle battery; determine an operating condition for the electric vehicle battery based on the desired use application; and send, responsive to the determination of the operating condition, a first control signal to the control unit; wherein the first control signal causes the control unit to operate the electric vehicle battery based on the desired operating condition.

According to an exemplary embodiment, the central controller is further configured to send an activation signal to the electric vehicle battery via the control unit such that the electric vehicle battery is caused to change state.

According to an exemplary embodiment, the status is based on a performance metric associated with the electric vehicle battery.

According to an exemplary embodiment, the performance metric is based on a predetermined threshold corresponding to at least one of an impedance, efficiency, charge capacity, discharge capacity, voltage, or current associated with the electric vehicle battery.

According to an exemplary embodiment, the controller is further configured to receive a load signal from a variable load coupled the central controller; and send a second control signal to the control unit coupled to the electric vehicle battery; wherein the second control signal causes the control unit to modify the operating condition of the electric vehicle battery.

According to an exemplary embodiment, the central controller is further configured to: receive power from a coupled power source; and responsive to receiving the power, deliver the power to the electric vehicle battery via the control unit.

According to an exemplary embodiment, the system further comprises a graphical user interface (GUI) in communication with the central controller, wherein the GUI is configured to receive an input from a user to alter the operating condition of the electric vehicle battery.

According to an exemplary embodiment, the desired use application may determine whether the electric vehicle battery is configured for delivery of power to a coupled variable load or configured for receipt of power from the coupled power source.

According to an exemplary embodiment of the disclosure, a second life battery system enabling reuse of unopened electric vehicle batteries, the system comprises: a plurality of electric vehicle batteries; a plurality of control units, wherein each of the plurality of electric vehicle batteries is operably coupled to each of the plurality of control units; a central controller operably coupled to each of the plurality of control units. The central controller may be configured to: receive a signal from each of the plurality of control units; determine a status corresponding to each of the plurality of electric vehicle batteries based on the received signals; determine a desired use application for each of the plurality electric vehicle batteries based on each status corresponding to each of the plurality of electric vehicle batteries; determine an operating condition for each of the plurality of electric vehicle batteries based on each respective desired use application; and send, responsive to the determination of each of the operating conditions, a first control signal to each of the plurality of control units, wherein the first control signals cause each respective control unit of the plurality of control units to operate each respective electric vehicle battery of the plurality of electric vehicle batteries based on each respective desired operating condition.

According to an exemplary embodiment, the plurality of electric vehicle batteries comprises a first electric vehicle battery and a second electric vehicle battery; wherein the plurality of control units comprises a first control unit and a second control unit; wherein the first vehicle battery is operably coupled to the first control unit and the second vehicle battery is operably coupled to the second control unit. The central controller may be further configured to: determine a first use application corresponding to the first electric vehicle battery and a second use application corresponding to the second electric vehicle battery; determine a first operating condition based on the first use application and a second operating condition based on the second use application; and send the first operating condition to the first control unit and the second operating condition to the second control unit.

According to an exemplary embodiment, the first operating condition corresponds to a first charge-discharge rate that is lower than a second charge-discharge rate corresponding to the second operating condition.

According to an exemplary embodiment, the system further comprises a bidirectional inverter coupled to the central controller; wherein the first operating condition requires DC power and the second operating condition requires AC power; wherein the central controller sends power from the second electric vehicle battery coupled to the second control unit operating under the second operating conditions to the inverter; and wherein the inverter converts power received from the second electric vehicle battery to AC power.

According to an exemplary embodiment, the first use application corresponds to a delivery of power from the first electric vehicle battery to a coupled variable load and the second use application corresponds to a provision of power to the second electric vehicle battery from a coupled power supply.

According to an exemplary embodiment, the plurality of electric vehicle batteries comprises a first subset of electric vehicle batteries and a second subset of electric vehicle batteries; wherein the plurality of control units comprises a first subset of control units and second subset of control units; wherein each of the first subset of electric vehicle batteries is operably coupled to each of the first subset of control units, respectively, and each of the second subset of electric vehicle batteries is operably coupled to each of the second subset of control units, respectively; wherein the central controller comprises a first part and a second part. The central controller may accordingly be configured to control the first subset of electric vehicle batteries via the first part and control the second subset of electric vehicle batteries via the second part.

BRIEF DESCRIPTION OF THE FIGURES

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION

Figure 1:
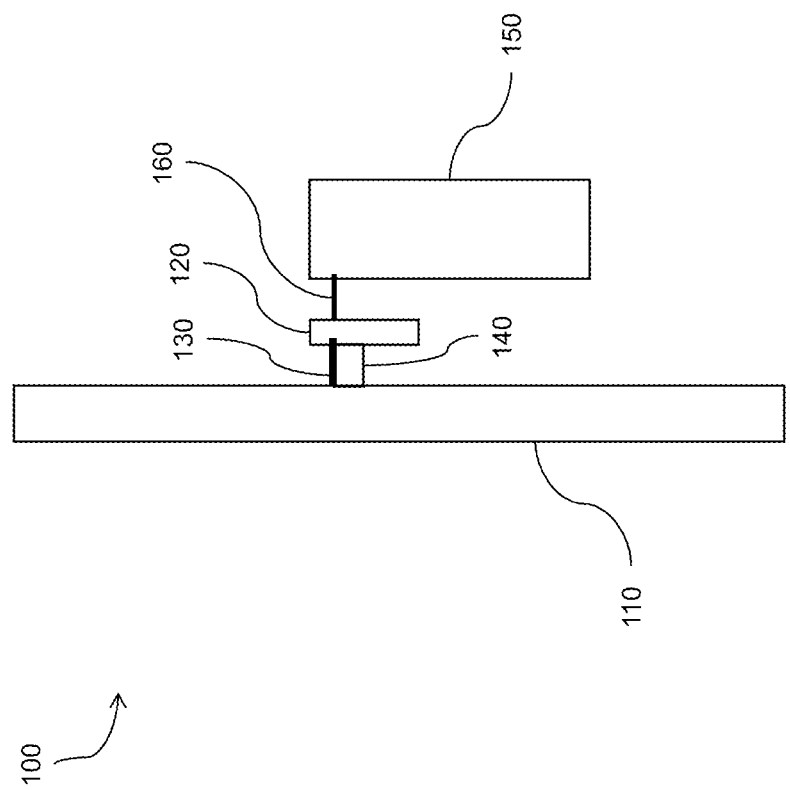
FIG. 1 shows a schematic drawing of a second life battery system having a control unit communicably coupled to an EV battery system according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Recent studies have shown that Li-ion batteries used in automotive applications can have longer than expected remaining lifetime. Developments have also been made to increase BMS quality and cell balancing with low risk of over-charge or over-discharge. The very high quality of automotive EV battery packs has enabled potential reuse of a complete, unopened battery pack. If the BMS is not able to receive code and signals showing safe automotive operations it will not correspondingly operate under optimal second life conditions and will limit the scope of use for second life applications. Consequently, a method is needed for establishing communication with an automotive BMS installed within a battery case to enable the complete battery pack to be reused.

Accordingly, it is among the objectives of the present disclosure to provide improvement over prior art approaches. It is also among the objectives of the present disclosure to provide a method and a system that enable communication with the BMS installed in an automotive battery that allow said battery to be used for a range of energy storage applications.

It is further among the objectives of the present disclosure to provide a method and system enable simulation of electrical signals sent and received by the battery BMS in such a way that, when the battery system is used after it has been removed from the electric vehicle, the BMS does not negatively affect the use of the battery for applications such as energy storage system. For example, the BMS of EV batteries may be configured with one or more safety features during first life use (e.g., related to driving patterns or activities of the EV) or may be programmed to not supply power until a predetermined action (e.g., an EV driver turning a key in the ignition or pushing a "start" button). Accordingly, to enable second life use, the BMS may require reprogramming to enable simulation of signals corresponding to the safety features from the first use and/or to remove the features entirely from the BMS.

It is further among the objectives of the present disclosure to provide a method and system that enables building larger energy storage systems. Specifically, the method relates to controlling building blocks (e.g., one or more EV batteries connected in series or in parallel to provide energy within a storage system) of automotive EV battery systems independently to enable both receiving and/or delivering both DC (direct current) and AC (alternating current) electric energy to or from the second life EV battery systems.

It is further among the objectives of the present disclosure to provide a method and system that enable operation of an energy system with one or several second life EV battery systems, which can be operated at a significantly lower cost compared to a rebuilt system.

The present disclosure provides a method in which, when an EV secondary battery is to be used after its first automotive life, the complete battery can be used without opening the battery pack and it, thereby, enables reuse of the BMS installed within the battery pack. Further, the present disclosure provides a method in which, when a battery is reconfigured, the automotive BMS does not substantially limit a scope of use for the battery.

Further, the present disclosure provides a method in which the unopened and reconfigured second life batteries can be used to build larger energy storage systems containing one or more pluralities of second life batteries for use in various applications. These systems may have increased scope of use as enabled by the inherent complexity of the automotive BMS. For example, an EV battery BMS may facilitate operation (e.g., turn ON/OFF) of fuses and/or switches within or connecting to the battery and thus engage or disengage one or more cells/modules within an EV battery from charging or discharging during use (e.g., within an energy storage system).

Referring generally to the figures, a second life battery system may include a control unit, which may be connected to the signal wiring for a battery (e.g., EV battery), according to at least one aspect of the present disclosure. The control unit may be configured to send and receive electrical signals from a BMS within EVs. The control unit may additionally have an embedded processor and/or another non-transitory computer-readable medium, which may include one or more programmed algorithms stored thereon to read the electrical signals associated with the BMS and send corresponding appropriate responses so that the BMS understands when the battery is operated under safe conditions. In various embodiments, the algorithms may include changing a load connected to a battery, reading a resulting voltage for a cell/module within the EV battery (or all cells/modules within the battery), and calculating a deviation and response time for each corresponding module/cell corresponding to the changed load. Furthermore, the algorithm could be repeated over a plurality of charge/discharge cycles to determine degradation trends during operation of the EV battery. Accordingly, if it is determined by the control unit that a degradation rate (e.g., as characterized by a change in a measured voltage or corresponding deviation or response time) for a particular cell/module or battery is faster than desired (e.g., meets a predetermined threshold rate), the control unit may send a control signal to the corresponding battery and cause the BMS to stop, rest, or limit further use of the particular cell/module or battery. Further, the control unit may send appropriate signals to the BMS that enable the battery to enter one or more predetermined modes including, but not limited to, safe start up and/or shut down, standby mode, charging or discharging, etc. Further, the control unit may gather data from the BMS, translate it and display it on a GUI (Graphic User Interface) for an operator or user to read pertinent information related to a state and health of the battery. In various embodiments, the control unit may be configured to receive input, via the GUI, from one or more users. In various embodiments, the control unit GUI may be configured to receive a query from a user, to enable determination of a battery-related parameters including, but not limited to, voltage, current output, state of charge, state of health, time in service, etc. In some embodiments, the GUI may be configured to receive an input causing the control unit to operate in one or more predetermined modes (e.g., safe start up, safe shut down, standby, charge, discharge, etc.).

According to at least one embodiment of the present disclosure, the control unit can be used as an energy storage system (which may also include energy backup systems) with an EV battery, or in an energy storage system where several EV batteries are mutually coupled (i.e., to form a larger energy storage system). In larger energy storage systems, the control unit connected to each EV battery may be communicably coupled to a central control system. The central control system may control batteries within the energy storage system. In various embodiments, the central controller may receive data from each individual battery pack and direct energy delivered to (e.g., from an electrical grid and/or renewable energy sources) and/or received from each of the EV battery packs according to one or more loads coupled to or associated with each of the individual EV battery packs (e.g., a battery/battery pack having a relatively high or low power rating may be coordinated with one or more high or low power applications, respectively, by the central controller). In various embodiments, the central controller may be coupled to one or more variable loads (e.g., structure, rapid charger, etc.) and/or energy sources (e.g., electrical grid, renewable energy source, etc.) and may be configured to facilitate directing energy delivered and/or received to corresponding applications through a coupled inverter (e.g., to convert DC energy from batteries to AC for delivery to variable load). The central controller may additionally have an embedded processor and/or another non-transitory computer-readable medium, which may include one or more programmed algorithms stored thereon to read the electrical signals associated with the BMS and send corresponding appropriate responses so that the BMS understands when the battery is operated under safe conditions. In various embodiments, the algorithms may include changing a load connected to a battery or battery pack, reading a resulting voltage for a cell/module within the EV battery (or all cells/modules within the battery), and calculating a deviation and response time for each corresponding module/cell corresponding to the changed load. Furthermore, the algorithm could be repeated over a plurality of charge/discharge cycles to determine degradation trends during operation of the EV battery. Accordingly, if it is determined by the central controller that a degradation rate (e.g., as characterized by a change in a measured voltage or corresponding deviation or response time) for a particular cell/module, battery, or battery pack is faster than desired (e.g., meets a predetermined threshold rate), the control unit may send a control signal to the corresponding battery and cause the BMS to stop, rest, or limit further use of the particular cell/module, battery, or battery pack.

Further, in various other embodiments of the present disclosure, the control unit for each battery/battery pack may include and/or be communicably coupled to a microprocessor or another non-transitory computer-readable medium, which may contain thereon one or more programmable algorithms that may be in compliance with most EV batteries from various automotive companies. In various embodiments, the central controller may be configured to detect or query a control unit to determine a type or types of algorithms contained within the control unit and, in response, determine a corresponding operational procedure or protocol to enable communication and operation of the control unit by the central controller. In other embodiments, the control unit may be configured to download one or more operating procedures based on the type or types of algorithms contained therein to facilitate operation of the battery/battery pack to which it is coupled. In various embodiments, downloading an EV battery specific software (e.g., associated with the EV battery manufacturer and/or a particular automotive company) may enable a standardized controller to be tailored to a specific EV battery requirement. Accordingly, a complete, unopened EV battery can be reused as a stand-alone energy storage system and/or included within a plurality of several EV batteries as a larger energy storage system through use of the aforementioned second life battery system. Furthermore, the second life battery system may contribute to reducing costs associated with repurposing EV batteries for second life use in comparison to methods and systems requiring disassembly and reassembly of modules having a new BMS.

Though there are some existing methods and assumed best practices for building battery systems, few address the requirements and conditions (e.g., second life battery degradation rates, degradation mechanisms, and/or corresponding preventative measures) needed to rebuild used battery systems to enable second life use in applications besides automotive. Moreover, no existing methods describe how to reuse a complete battery system for second life use without opening the battery case. A potential reason may be related to a misconception that after use in an automotive application, a balance of plant for EV battery modules are uneven and there are a large differences in the cell impedances and the cell voltages among the cells. We have, on the other hand, found that this is not the case.

Generally, sourcing batteries for automotive applications places stringent requirements on battery manufacturers and, typically, only tier 1 products are accepted (e.g., cells within the batteries are balanced and/or only cells falling within specified operational ranges). Furthermore, a BMS developed for automotive use is more advanced (e.g., includes more safety features, generally operates within higher voltage and power ranges) in comparison with low-cost consumer electronics and power tools. Accordingly, battery performance in automotive applications, in comparison to use in other electronics and contrary to popular opinion, is correspondingly increased. Thus, it would be advantageous to provide a method for reusing a complete battery system, which focuses on reconfiguring software and electrical signal processing as an alternative to methods based on mechanically disassembly of the battery pack, sorting cells and modules, and rebuilding them into a new system. Methods that are safe, reliable, and easy to use (i.e., by a battery manufacturer) for repurposing an EV battery for energy storage applications that do not require opening the battery pack do not currently exist. Accordingly, a method for reconfiguring software and signal processing of the battery pack would be advantageous due to simplicity of design and associated cost reductions in manufacturing a final product (e.g., second life battery pack).

Accordingly, a method and system are described herein that allows for a complete, unopened EV battery or a plurality of unopened EV batteries to be used as a stand-alone energy storage unit and/or connected to a number of other EV batteries to form a large energy storage system. Furthermore, the aforementioned method and system relate to the use of a control unit within a second life battery system that communicates with the BMS of an EV battery. The control unit within the second life battery system may contain both hardware and software and may be wired to the EV battery via signal cables and/or power cables. The software may read and translate signals (e.g., voltage, current, state of charge, state of health, impedance, etc.) sent from the EV battery BMS. In addition, the software may send commands (e.g., commands to cells/modules/batteries to turn on/off, ramp voltage and/or current up/down, etc.) to the BMS inside the battery pack. The software may include one or more programs or subroutines that read and send signals to and from the EV battery BMS to enable the battery to deliver energy and receive energy according to application (i.e., a coupled variable load) needs (e.g., increased power for fast charge applications, increased power allocations for power delivery during peak times, incorporating grid support, providing backup power, etc.).

One embodiment of the disclosure includes software, executed within the control unit, to translate (e.g., ensuring received signals can be understood and correspond to appropriate programming languages, have commands aligned with set operational protocols, ensuring registers are correct, etc.) the signals from the EV battery and send commands to a coupled controller (e.g., the standardized controller) so that it subsequently sends appropriate response signals in response. For example, in automotive use, the EV battery may have several functions that are mandatory in an EV (e.g., start engine/motor, power dashboard, etc.) but not required for a stationary application (e.g., energy storage). Consequently, the software may generate and send signals to the EV battery BMS that align with operation of the EV battery within a particular application (e.g., coupled load). In another example, during fuel gauging when a battery used in a second life energy storage system, the battery should generally not be operated at low depths of discharge (e.g., as defined or determined by a voltage reading) as it can increase risk of rapid degradation. Thus, for example, battery fuel gauge signals (i.e., level of charge/discharge) are monitored such that appropriate discharge levels are maintained. In various embodiments, a battery having 20% or less remaining capacity (as determined by a voltage reading) may be transitioned from a discharge operation to a charge operation to preserve lifetime of the battery. In another example, safety signals, which may relate to safe automotive operations and monitoring measures (e.g., pressure sensors, power requirements for dashboard, limp home functions etc.), can be maintained by the control unit to indicate appropriate battery operation conditions required for a particular application. Furthermore, the software contained within the control unit may be configured to instruct the control unit to send appropriate signals to the EV BMS so operational conditions do not negatively affect use of the battery in stationary energy storage systems.

In another embodiment of the disclosure, the control unit may include hardware (e.g., housing, microprocessor, fuses, resistors, memory, WiFi connections, Ethernet connections, etc.) wherein the hardware is coupled to both signal wires and power wires coming out of the EV battery. The hardware components may be produced in accordance with required safety standards for energy storage use. In various embodiments, the hardware may include a microprocessor, electric signal processor and generator, and/or data storage (e.g., memory) for capturing data and storing embedded software data. In various embodiments, data storage is carried out continuously during operation of EV battery and may include storage of battery-related operation parameters including, but not limited to, capacity, voltage, current, time in operation, impedance, charge/discharge rate, etc. The hardware may also house additional electronic components to ensure false signals and/or noise are not received or sent that can cause any safety issues with the operation of the battery. The hardware may also include additional switches, relays, circuitry, and resistors to deliver energy to the battery pack from one or more DC sources (e.g., renewable energy sources such as photovoltaic solar energy systems) and send energy from the battery pack to the one or more DC sources.

In another embodiment of the disclosure, the control unit may be coupled to a central controller. The central controller may be used when multiple EV battery packs are connected together through communication with each control unit coupled to each respective EV battery pack. The central controller may monitor each pack (e.g., via the control units) and enable operable coupling of the packs together for delivery of energy (e.g., to one or more applications, such as a structure, chargers, etc.). In various embodiments, the central controller may be configured to activate or deactivate one or more batteries or battery packs within a second life battery system. In various embodiments, the central controller may detect a status of each pack and, based at least in part on the detected status (e.g., state of health, state of charge, impedance, current, voltage, etc.), determine which pack is best used for a particular application and/or operation (e.g., high power capacity batteries may be allocated for use in a high power application such as faster chargers, whereas a low power capacity battery/battery pack may be allocated for use in lower powered applications such as lighting). When combining several previously used batteries (i.e., second life batteries) into a combined system, prior use information may be required by the controller as historical use (i.e., use of the battery during its first life) of each battery might differ, which may result in variations in performance metrics including, but not limited to, capacity, impedance, power rating, etc. among the packs. The central controller may receive performance metric information from a control unit coupled to each pack and embedded software within the central controller may determine how each pack should best be used (i.e., determine operating parameters for each pack) to deliver energy required from the second life battery system. For example, if one pack in the second life battery system shows lower capacity than the average (e.g., as determined by the central controller), it will not be over-discharged or over-charged (e.g., as determined by a voltage reading corresponding to the battery). In various embodiments, an operational voltage for a second life battery may range from 3V to 4.2V. In another example, if high impedance (e.g., based on a predetermined impedance threshold defined by a manufacturer, user, operator, etc.) for a battery pack is determined by the central controller, the pack can be charged and discharged at a lower rates (i.e., lower c-rates) to maximize retained capacity and prevent rapid capacity loss. In various embodiments, the central controller may send status information associated with each pack to a graphical user interface (GUI), wherein the GUI may display warnings (e.g., that one or more battery packs are not operating within a desired performance range) or report (e.g., via visual, audio, and/or haptic notification) a need for replacement or maintenance on a battery pack that is showing poor performance (e.g., one or more performance metrics are outside of one or more predetermined thresholds or set points). In various embodiments, warnings may further include, but are not limited to, a warning to turn the system off, to indicate a need or request for maintenance, indicate unsafe operation, etc.

In various embodiments the central controller for a second life battery system containing several battery packs may enable simultaneous charge and discharge of various battery packs within the second life battery system. Generally, an EV battery has a power to energy ratio often suited for automotive use. For example, an EV battery within a Nissan® Leaf may have a 90 KW power to 24 KWh-30 KWh energy ratio. The high power of such an EV battery may be required for acceleration of the EV and fast charging of the EV battery. Often, for many energy storage systems, a 1:1 ratio of power to energy is preferred since a 1:1 ratio may facilitate operation within a broader range of operational parameters when using second life EV batteries as energy storage compared to newly built energy storage batteries. In various embodiments wherein the second life battery system includes one or more EV batteries having a high power capability (e.g., defined by a power delivery capacity vs. maximum capacity of the battery), the central controller can cause a first subset of the battery packs in the second life battery system to discharge and simultaneously cause a second subset of the battery packs to charge. In other embodiments, the central controller can cause a first subset of the battery packs within the second life battery system to discharge at first rate and cause a second subset of the battery packs to discharge at a second rate. In various embodiments, the first rate may be the higher, lower, or the same as the second rate. In yet other embodiments, the central controller may control a plurality of subsets of battery packs within the second life battery system, wherein each of the subsets of the plurality of subsets is operated at a different discharge rate as controlled by the central controller. In various embodiments, the second discharge rate may be based on or dependent on the first discharge rate. In other embodiments, the first and the second discharge rates can be independent of each other. In some embodiments, the central controller may enable the second life battery system to be used to deliver or receive energy to or from several sources simultaneously by allocating battery packs in the second life battery system to one or more subsets, wherein each subset may be operated according to a particular energy need. For example, the central controller may enable the second life battery system to simultaneously deliver energy to a building and to a fast charging station, wherein one subset of the battery packs is operated to deliver energy to the building and a second subset of battery packs is operated to deliver energy to the fast charging station. For example, a Nissan® Leaf with a power to energy ratio of 50 KW to 30 KWh, may only require a first subset of three second life batteries (or battery packs), wherein each battery (or battery pack) is caused to operate at approximately a 1C discharge rate (i.e., 1C is equal to 15 KW for a second life Nissan® Leaf battery) by the central controller. Furthermore, in another example, the second life battery system may be capable of producing 150 KWh and may include 10 battery packs. Accordingly, in an embodiment, the second life battery system can cause (via the central controller) a second subset of 3 battery packs, in addition to the first subset of 3 battery packs, to charge at a 1C discharge rate to ensure energy can be sent to a coupled fast charging station (i.e., in addition to sending energy to a coupled Nissan® Leaf). In an embodiment, the second life battery system may have additional available energy from the remaining 4 battery packs not included within either of the first subset or the second subset, which can be used to deliver energy to and from a building. Thus, the central controller can simultaneously operate battery packs within the second life battery system to support one or more applications (e.g., one or more variable loads) by causing individual battery packs or groups of battery packs to operate at varying operational parameters (e.g., discharge rate, charge rate, etc.).

In various embodiments, the second life battery system may operate using DC and AC power simultaneously. In general, many energy storage systems may be connected to one or more inverters to enable AC functions despite one or more DC inputs. For example, with renewable energy systems, there is a significant advantage in having an energy storage system that can operate with DC power as fast charging and photovoltaic solar energy applications tend to use and produce DC energy. Generally, converting energy first to AC and then back to DC to enable connection to a battery system adds cost and complexity. Since the central controller can distribute second life battery packs among multiple applications or loads (e.g., fast charge station, building, vehicle battery, etc.) as previously described, some of the second life battery packs within the second life battery system can be operably coupled to an inverter to enable battery packs within a first subset to meet AC needs while some of the battery packs can be operated to meet DC needs in a second subset. Generally, simultaneous accommodation of AC and DC needs is difficult using a newly built battery/battery system as there may either be insufficient energy or insufficient power for a 1:1 ratio of energy to power within the newly built system when splitting the comprising battery packs to accommodate multiple uses. To accommodate multiple uses (e.g., simultaneous operation for AC and DC applications, simultaneous energy/power supply to multiple destinations, etc.), such newly built systems are frequently either over-dimensioned for power or for energy, both of which add to system costs For example, a building might require delivery of 10 KW of power over a time period of 10 hours, which would require power supply from a 100 KWh/10 KW second life battery system. Furthermore, should the second life battery system be used for fast charging applications, wherein a fast charger might require 50 KW over 0.5 hours or a 50 KW/50 KWh system. Accordingly, to meet both requirements, the second life battery system may incorporate a 100 KWh/50 KW system, wherein the energy to power ratio may either supply 5× the power required by the building, or 2× the energy that the fast charger requires.

FIG. 1 shows a schematic representation of a battery 110 within a second life battery system 100, according to an exemplary embodiment. Battery 110 may be a second life battery/battery pack that is unopened after removal from a first life use or application. As shown in FIG. 1, the unopened battery 110, which may include a BMS, is operably coupled to a control unit 120 (e.g., via the BMS of the battery 110). In various embodiments, the battery 110 may be a Li-ion battery configured for use in an EV. In various embodiments, the battery 110 may be configured to provide energy/power to one or more energy systems including, but not limited to, fast charge stations, buildings, EVs, backup storage systems, etc. As shown, the battery 110 is operably coupled to the control unit 120 via electronic connections 130 and 140. In various embodiments, electronic connections 140 and/or 130 may send/receive power from the battery 110. In various embodiments, electronic connections 140 and/or 130 may be configured to enable the control unit 120 to send/receive one or more signals to/from the battery 110. In various embodiments, the one or more signals may include an impedance, capacity, state or depth of charge (DoC), state or depth of discharge (DoD), one or more performance metrics (e.g., charge/discharge efficiency), a status (e.g., state of health, state of charge, etc.) associated with the battery 110, etc. In various embodiments, the controls unit 120 may include hardware and software required to process the signals (e.g., voltage, current, etc.) that may be received from the battery 110. In various embodiments, the control unit hardware may include, but is not limited to, one or more controllers, one or more processors and/or microprocessors (e.g., CPU), a memory, etc. In various embodiments, the control unit 120 hardware may also include a housing to contain the one or more controllers, processors, and/or memory. In various embodiments, the control unit 120 software may include one or more algorithms (e.g., similar or equivalent to described previously) to facilitate reading signals received from the battery 110 and enable the control unit 120 to send appropriate control signals in response. As shown in FIG. 1, the control unit 120 is operably coupled to an inverter 150 via electronic connection 160, thus communicatively coupling the battery 110 to the inverter 150. In various embodiments, electronic connection 160 may also include a connection directly to a DC-powered system, wherein the resulting DC voltage and current may be controlled via a DC controller (e.g., DC-bus) included within the control unit 120. In various embodiments, and as shown in FIG. 1, a battery 110 may be configured within a second life battery system 100 to have a coupled control unit 120, which may enable measuring and reporting of a status of battery 110 to ultimately facilitate delivery of DC and/or AC power.

Figure 2:
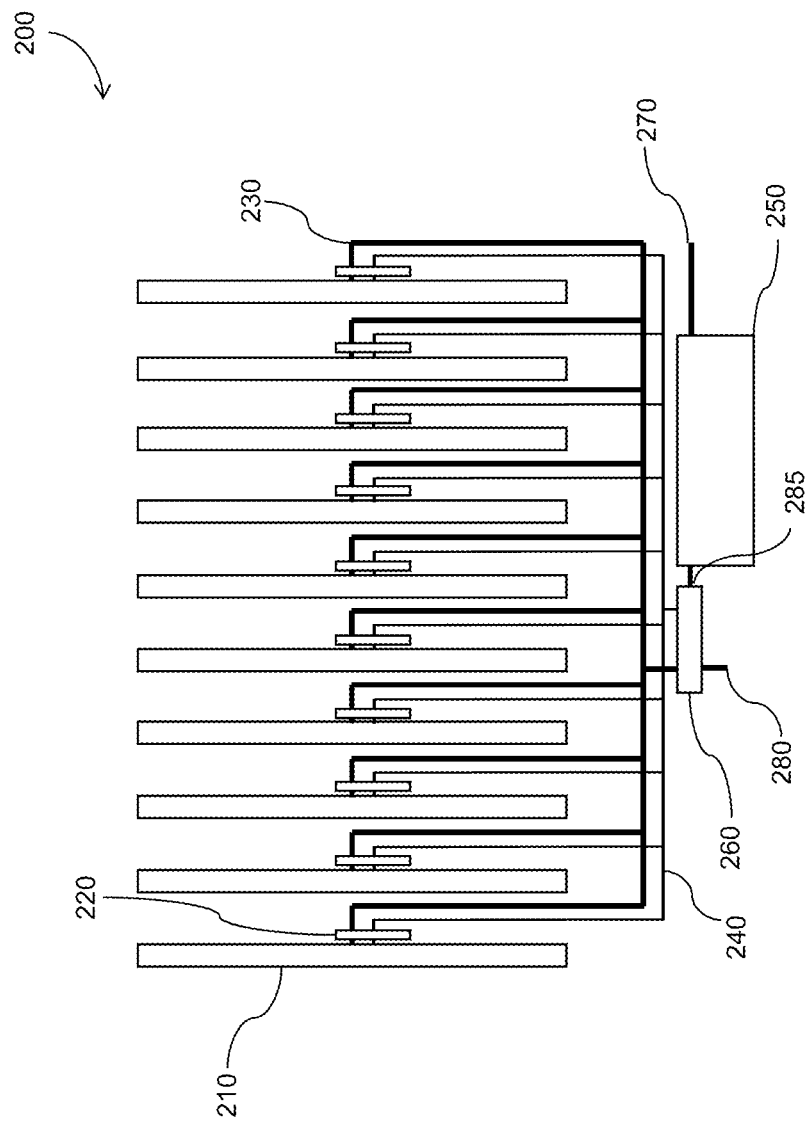
FIG. 2 shows a schematic drawing of a plurality of EV batteries communicably coupled to a central control unit within a second life battery system, according to an exemplary embodiment.

FIG. 2 shows a schematic representation of a second life battery system 200, according to an exemplary embodiment. As shown, second life battery system 200 may include a plurality of second life batteries 210 (each similar or equivalent to battery 110). Each battery 210 may be operably coupled to a respective control unit 220 (each similar or equivalent to control unit 120). Although FIG. 2 shows the second life battery system 200 including ten batteries 210 (each with a corresponding control unit 220), the second life battery system 200 may be configured to have any number of batteries 210 with corresponding control units 220. As shown in FIG. 2, each battery 210 and its respective control unit 220 are coupled to a central controller 260 via electronic connections, which include a power wire 230 and a signal wire 240. In various embodiments, signal wire 230 (which may be similar or equivalent to electronic connection 130) may be configured to enable each control unit 220 to send/receive one or more signals to/from each respective battery 210. In various embodiments, the one or more signals may include an impedance, capacity, state or depth of charge (DoC), state or depth of discharge (DoD), one or more performance metrics (e.g., charge/discharge efficiency), a status associated with each battery 210, etc. In various embodiments, each control unit 220 may include hardware and software required to process the signals that may be received from each respective battery 210. In various embodiments, each control unit 220 hardware may include, but is not limited to, one or more controllers, one or more processors and/or microprocessors (e.g., CPU), a memory, etc. In various embodiments, each control unit 220 hardware may also include a housing to contain the one or more controllers, processors, and/or memory. In various embodiments, each control unit 220 software may include one or more algorithms to facilitate reading signals received from each respective battery 210 and enable the control unit 220 to send appropriate control signals in response. As shown in FIG. 2, the central controller 260 may have other electronic connections, which may include DC power wires 280 and 285 to enable delivery of DC current and/or AC power, respectively. As shown, DC power wire 285 may operably couple the central controller 260 to an inverter 250. An AC power wire 270, which is connected to the inverter 250, may then enable delivery of AC current according to a predetermined use application or a coupled variable load. In various embodiments, the central controller 260 may include a DC controller (e.g., DC-bus) to facilitate delivery of DC power and another controller to enables the DC controller to direct power from one or more of the batteries 210 to power wire 280 and/or power wire 285 (where power is ultimately directed to AC power wire 270). In various embodiments, the controller 260 may also enable supply of power to one or more of the batteries 210 (e.g., to charge or revive batteries 210) through DC power wire 280 and/or AC power wire 270.

Figure 3:
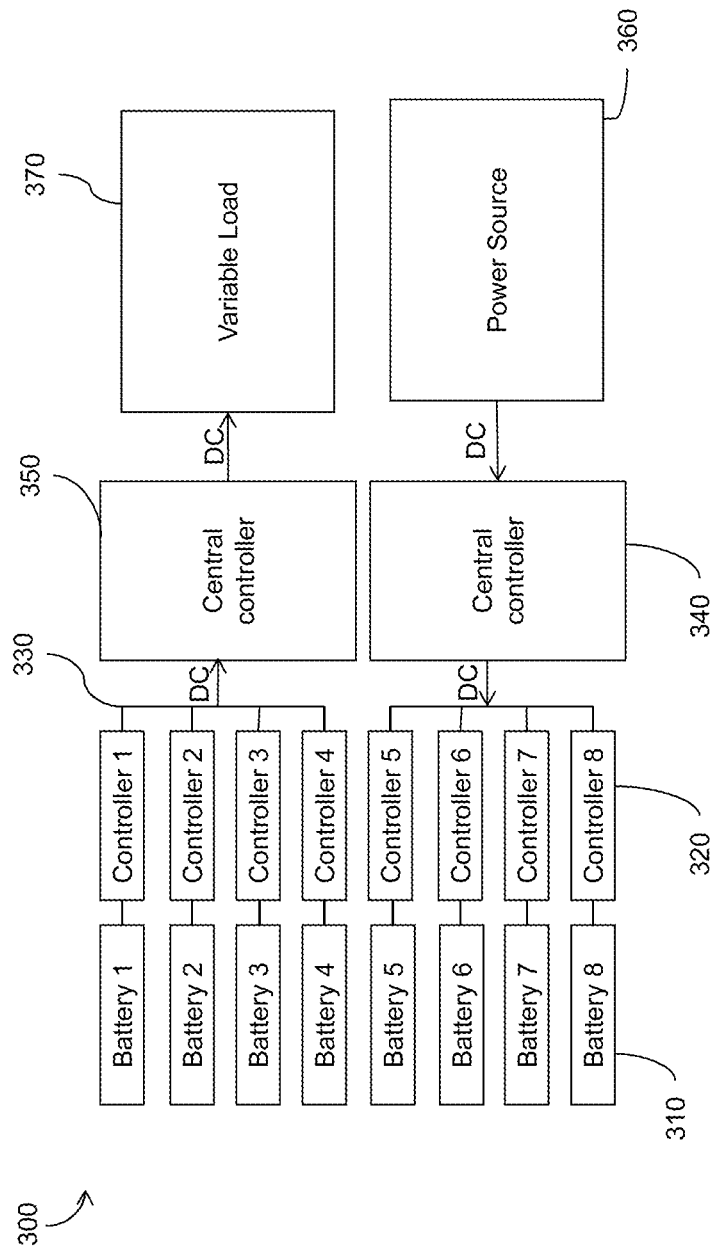
FIG. 3 shows a schematic block diagram of various individual operations of EV batteries that enable both receiving and delivery of power from a second life EV battery system, according to an exemplary embodiment.

FIG. 3 shows a schematic representation of a second life battery system 300 (similar or equivalent to systems 100 and/or 200), according to an exemplary embodiment. As shown in FIG. 3, second life battery system 300 includes a plurality of second life batteries 310 (each similar or equivalent to battery 110 and/or 210), wherein each of the second life batteries 310 is operably coupled to a respective control unit 320 (equivalent or similar to control unit 120 and/or 220). In various embodiments, each of the second life batteries 310 may be a Li-ion EV battery. Each control unit 320 may be operably coupled, via one or more signal wires 330 (similar or equivalent to signal wire 240), to a central controller having parts 340 and 350. As shown in FIG. 3, a first portion of the batteries 310 and control units 320 may be coupled to central controller part 340 and a second portion of the batteries 310 and control units 320 may be coupled to central controller part 350. Although FIG. 3 shows second life battery system 300 having 8 batteries 310 with corresponding control units 320, in various embodiments, second life battery system 300 may include any number of batteries 310 and coupled control units 320. Central controller parts 340 and 350 may enable simultaneous delivery of energy to batteries 310 and provision of power to a coupled DC power load. Although FIG. 3 shows second life battery system 300 having a central controller with two parts 340 and 350, in various embodiments, second life battery system 300 may include any number of central controller parts to facilitate delivery of energy and/or provision of power according to one or more needed use applications. As shown in FIG. 3, central controller part 350 is coupled to a first portion of batteries 310 (i.e., batteries 310 labeled "Battery 1" through "Battery 4") to deliver DC power to a variable DC load 370. In various embodiments, load 370 may be a fast charge station, a building, an EV, etc. As shown in FIG. 3, central controller part 340 is coupled to a second portion of batteries 310 (i.e., batteries 310 labeled "Battery 5" through "Battery 8") receive power from a coupled power source 360. In various embodiments, power source 360 may be a photovoltaic or solar-powered source. Although FIG. 3 shows second life battery system 300 including one variable load 370 and one power source 360, various embodiments of second life battery system 300 may include any number of variable loads 370 and/or power sources 360.

Figure 4:
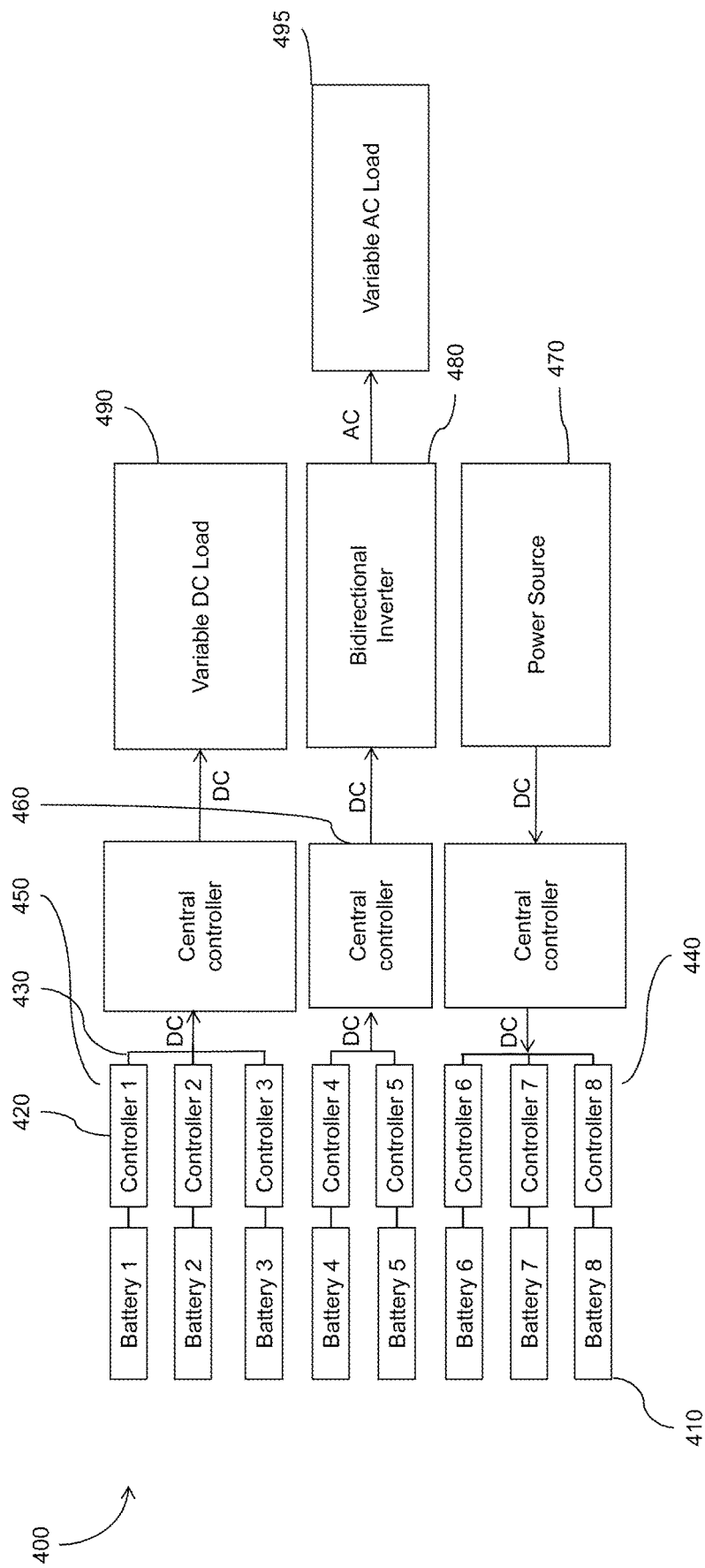
FIG. 4 shows a schematic block diagram of a second life EV battery system receiving energy from a renewable energy source and delivering the received energy to a fast charging station and/or to a structure, according to an exemplary embodiment.

FIG. 4 shows a schematic representation of second life battery system 400, according to an exemplary embodiment. As shown, second life battery system 400 (similar or equivalent to systems 200 and/or 300) includes a plurality of batteries 410 (similar or equivalent to batteries 110, 210, and/or 310), wherein each of the batteries 410 is operably coupled to a respective control unit 420 (similar or equivalent to control units 120, 220, and/or 320). In various embodiments, each of the second life batteries 410 may be a Li-ion EV battery. Each of the control units 420 are further coupled, via one or more signal wires 430, to a central controller having parts 440, 450, and 460. Central controller parts 440, 450, and 460 enable second life battery system 400 to simultaneously send/receive energy/power from one or more loads and/or power sources. Although FIG. 4 shows the central controller having 3 parts 440, 450, and 460, in various embodiments, second life battery system 400 may include any number of central controller parts to facilitate delivery of energy and/or provision of power according to one or more needed use applications. In various embodiments, central controller parts 440, 450, and 460 may be configured to enable delivery of energy to the second life battery system 400 while simultaneously providing both an AC and DC power supply to one or more coupled variable loads (e.g., building, fast charge station, etc.). As shown in FIG. 4, central controller part 450 is coupled to a first portion of batteries 410 (i.e., batteries 410 labeled "Battery 1" through "Battery 3") to enable delivery DC power to a variable DC load 490 (e.g., fast charge station). Central controller part 460 is coupled to a second portion of batteries 410 (i.e., batteries 410 labeled "Battery 4 through "Battery 5") to deliver power to a bidirectional inverter 480 for conversion of DC power into AC power for supply to a variable AC load 495. Finally, central controller part 440 is coupled to a third portion of batteries 410 (i.e., batteries 410 labeled "Battery 6" through "Battery 8"), which are configured to receive DC power from a coupled power supply (e.g., a photovoltaic solar system). Although FIG. 4 shows second life battery system 400 including one each of variable load 490, inverter 480, and power source 470, various embodiments of second life battery system 400 may include any number of variable loads 490, inverters 480, and/or power sources 470.

Figure 5:
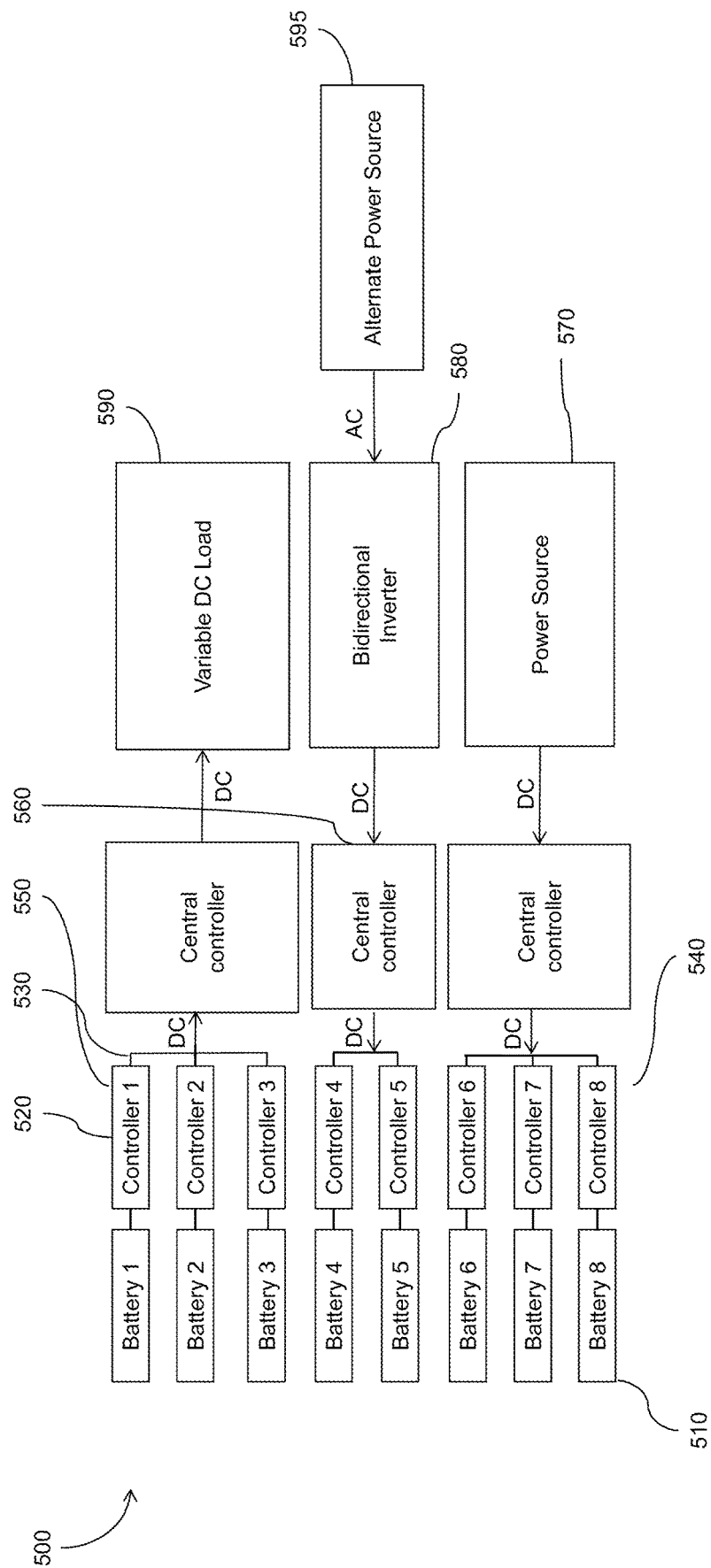
FIG. 5 shows a schematic block diagram of a second life EV battery system receiving energy from a renewable energy source and an electrical grid and delivering the energy to a fast charging station, according to an exemplary embodiment.

FIG. 5 shows a schematic representation of a second life battery system 500, according to an exemplary embodiment. As shown, second life battery system 500 includes a plurality of batteries 510 (similar or equivalent to batteries 110, 210, 310, and/or 410), each operably coupled to a respective control unit 520 (similar or equivalent to control units 120, 220, 320, and/or 420). Each control unit 520 may be coupled, via one or more signal wires 530, to a central controller having parts 540, 550, and 560. Although FIG. 5 shows the central controller having 3 parts 540, 550, and 560, in various embodiments, second life battery system 500 may include any number of central controller parts to facilitate delivery of energy and/or provision of power according to one or more needed use applications. In various embodiments, central controller parts 540, 550, and 560 may be configured to enable delivery of energy to the second life battery system 500 while simultaneously providing both an AC and DC power supply to one or more coupled variable loads (e.g., building, fast charge station, etc.). As shown in FIG. 5, central controller part 550 is coupled to a first portion of batteries 510 (i.e., batteries 510 labeled "Battery 1" through "Battery 3") to enable delivery DC power to a variable DC load 590 (e.g., fast charge station). Central controller part 560 is coupled to a second portion of batteries 510 (i.e., batteries 510 labeled "Battery 4 through "Battery 5") to enable receiving power from an alternate AC power source 595 via a bidirectional inverter 580, which may convert received AC power to DC power. Finally, central controller part 540 is coupled to a third portion of batteries 510 (i.e., batteries 510 labeled "Battery 6" through "Battery 8"), which are configured to receive DC power from a coupled DC power supply (e.g., a photovoltaic solar system). Although FIG. 5 shows second life battery system 500 including one each of variable load 590, inverter 580, and power source 570, various embodiments of second life battery system 500 may include any number of variable loads 590, inverters 580, and/or power sources 570.

Figure 6:
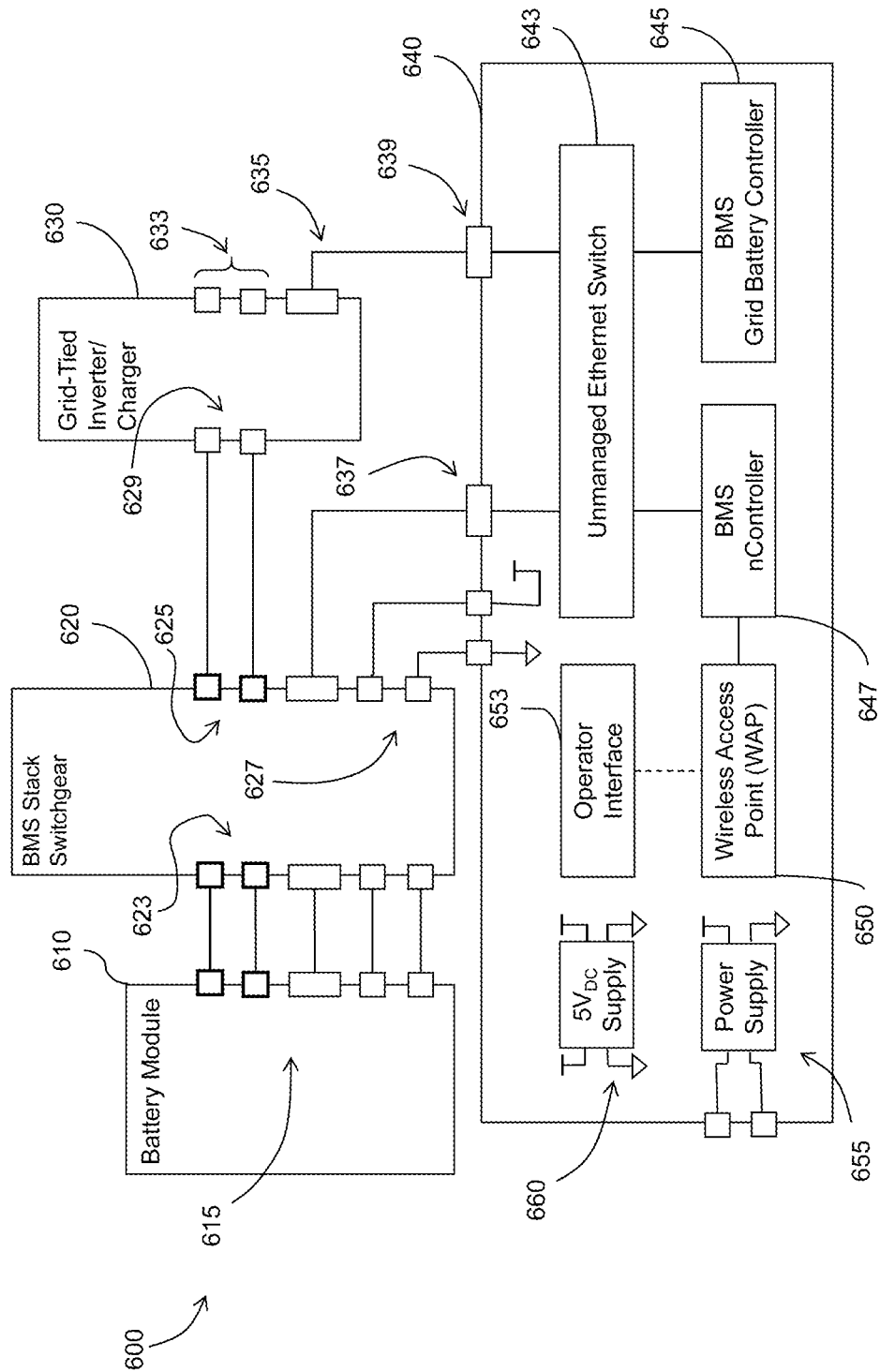
FIG. 6 shows a schematic block diagram illustrating how a second life battery can be connected to a controller, switch gear and inverter/grid, according to an exemplary embodiment.

FIG. 6 shows a schematic representation of a second life battery system 600, according to an exemplary embodiment. As shown, a second life battery ("Battery Module) 610 may be operably coupled to a central controller 640 (via a connection 637). A switch gear 620 (having connections 623, 625, 627, which connect to the battery module 610, inverter 630, and central controller 640, respectively) and/or an inverter/grid 630 (having connections 629, 633, and 635, which enable connections to the switch gear, grid, and controller 640, respectively) may be operably coupled to the second life battery 610 and the central controller 640 via one or more connections 637, and/or 639, which enable the central controller 640 to receive signals pertaining to the second life battery 610 and send corresponding operation commands and/or signals to facilitate appropriate operation (e.g., charge/discharge) of the second life battery 610 to support one or more coupled loads. In various embodiments, the switch gear 620 may be configured to control power and/or voltage associated with the battery 610. In an embodiment, the switch gear 620 may be configured to control power and/or voltage associated with the battery 610 when one or more switches and/or fuses within the battery 610 cannot be used or cease to function. As shown, central controller 640 may include an Ethernet switch 643, which is coupled to one or more BMS controllers 645 and 647. In various embodiments, the grid battery controller 645 may be configured to control operations of the central controller 640 and battery module 610 that relate to connection, delivery, and/or receipt of power from a grid (e.g., via inverter 630). In various embodiments, nController 647 may be configured to control operations of the central controller 640 and battery module 610 that relate to connection, delivery, and/or receipt of power among one or more connected additional battery modules. The central controller 640 may also include a wireless access point 650 (e.g., to enable wireless communications and control) and an operator interface 653 (e.g., GUI). The central controller 640 may also include one or more power supplies 655 and 660. In various embodiments, the second life battery 610 may be an EV battery such as, for example, a Nissan® Leaf battery.

Figure 7:
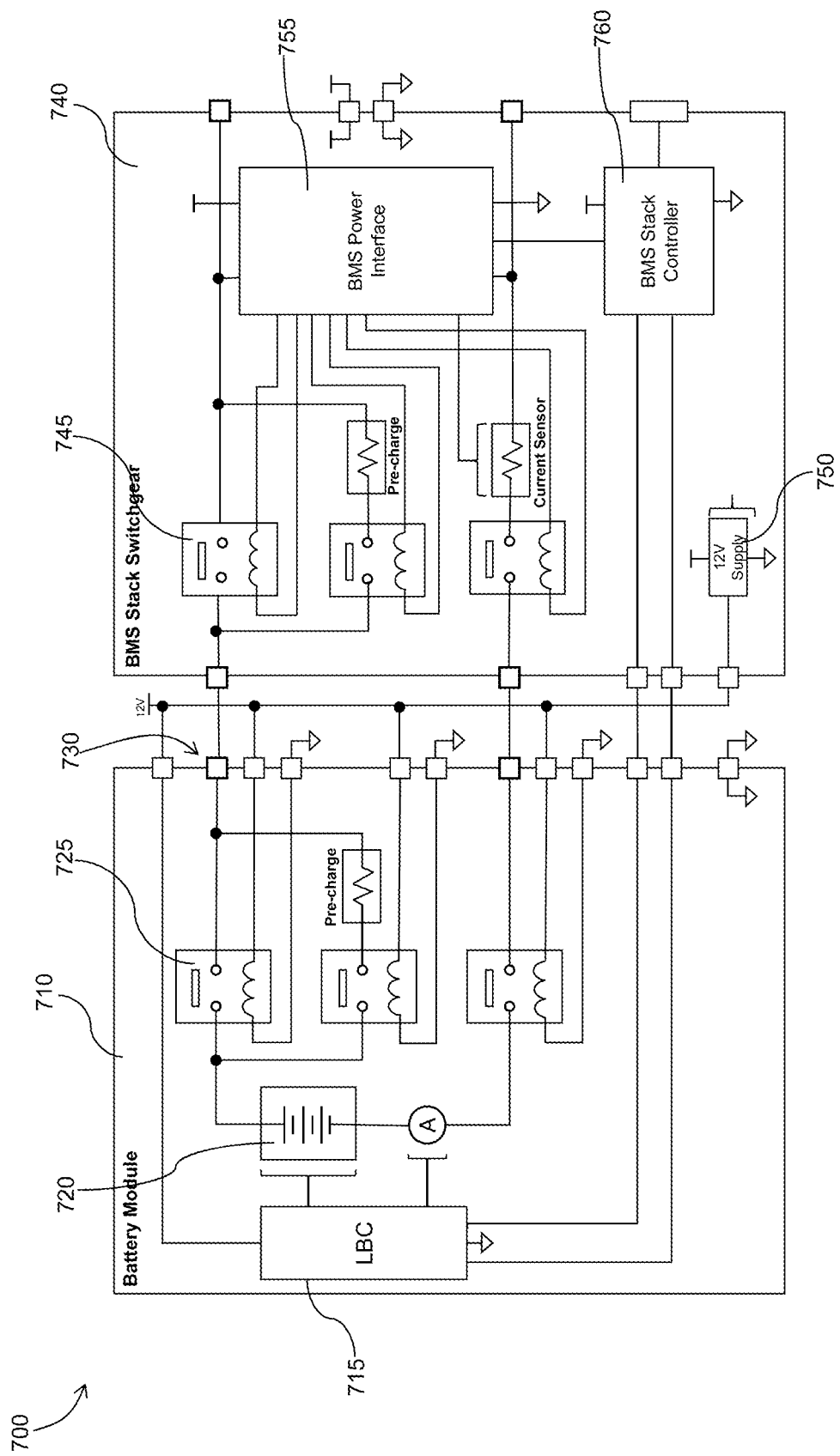
FIG. 7 shows a schematic block diagram illustrating how a second life battery may be wired to a control unit, according to an exemplary embodiment.

FIG. 7 shows a schematic representation of a second life battery system 700, according to an exemplary embodiment. As shown, a second life battery ("Battery Module") 710 having a battery cell 715 is coupled to a central controller 740 ("BMS stack switchgear"). FIG. 7 further illustrates hardware components within each of the battery 710 and the coupled central controller 740, including power and signal wires 730, which enable the central controller 740 to receive signals from the battery 710 and send corresponding operation commands and/or signals to facilitate appropriate operation (e.g., charge/discharge) of battery 710 to support one or more coupled loads. In various embodiments, the second life battery 710 may be an EV battery such as, for example, a Nissan® Leaf battery. As shown, the central controller 740 may include a power source 750 and a BMS power interface 755, which is configured to receive signals from the battery 710 and/or enable (e.g., by receiving input from a user or an external controller) communication with the coupled battery 710 via power and signal wires 730. In various embodiments, the central controller 740 may include a BMS stack controller 760, which is configured to send control signals to the battery 710 via the signal wires 730, which are subsequently translated and/or transmitted to the cell 715 via one or more circuits 725 and carried out by controlled voltage and current sources 720.

In various embodiments, a method for reusing a second life battery may comprise: receiving, by a central controller, a signal from a control unit coupled to an electric vehicle battery; processing, by a processor in communication with the central controller, the signal received from the control unit; determining, by the processor, a status of the electric vehicle battery based on the processed signal; determining, by the processor, a desired use application for the electric vehicle battery based on the status of the electric vehicle battery; determining, by the processor, an operating condition for the electric vehicle battery based on the desired use application; and sending, by the central controller, responsive to the determination of the operating condition, a first control signal to the control unit coupled to the electric vehicle battery. In various embodiments, the control signal may cause the control unit to operate the electric vehicle battery based on the desired operating condition.

In various embodiments, the method may also comprise sending, by the central controller, an activation signal to the electric vehicle battery via the control unit such that the electric vehicle battery is caused to change state. In various embodiments, the status may be based on a performance metric (e.g., capacity, voltage, current, impedance, etc.) associated with the electric vehicle battery. In various embodiments, the performance metric may be based on a predetermined threshold corresponding to at least one of an impedance, efficiency, charge capacity, discharge capacity, voltage, or current associated with the electric vehicle battery.

In various embodiments, the method may further comprise: receiving, by the central controller, a load signal from a variable load coupled the central controller; and sending, by the central controller, a second control signal to the control unit coupled to the electric vehicle battery; wherein the second control signal causes the control unit to modify the operating condition of the electric vehicle battery. In some embodiments, the method may further comprise: receiving, by the central controller, power from a coupled power source; and responsive to receiving power, deliver the power to the electric vehicle battery via the control unit.

In various embodiments, a second life battery system enabling reuse of unopened electric vehicle batteries may comprise: an electric vehicle battery coupled to a control unit and a central controller operably coupled to the electric vehicle battery via the control unit. In various embodiments, the central controller may be configured to: receive a signal from the control unit; determine a status of the electric vehicle battery based on the received signal; determine a desired use application for the electric vehicle battery based on the status of the electric vehicle battery; determine an operating condition for the electric vehicle battery based on the desired use application; and send, responsive to the determination of the operating condition, a first control signal to the control unit. In various embodiments, the first control signal causes the control unit to operate the electric vehicle battery based on the desired operating condition.

In various embodiments, the central controller is further configured to send an activation signal to the electric vehicle battery via the control unit such that the electric vehicle battery is caused to change state. In some embodiments, the status is based on a performance metric associated with the electric vehicle battery. In various embodiments, the performance metric is based on a predetermined threshold corresponding to at least one of an impedance, efficiency, charge capacity, discharge capacity, voltage, or current associated with the electric vehicle battery.

In various embodiments, the central controller is further configured to receive a load signal from a variable load coupled the central controller and send a second control signal to the control unit coupled to the electric vehicle battery. In some embodiments, the second control signal causes the control unit to modify the operating condition of the electric vehicle battery. In some embodiments, the central controller is further configured to: receive power from a coupled power source; and responsive to receiving the power, deliver the power to the electric vehicle battery via the control unit.

In various embodiments, the second life battery system further comprises a graphical user interface (GUI) in communication with the central controller, wherein the GUI is configured to receive an input from a user to alter the operating condition of the electric vehicle battery. In various embodiments, the desired use application may determine whether the electric vehicle battery is configured for delivery of power to a coupled variable load or configured for receipt of power from the coupled power source.

In various embodiments, a second life battery system enabling reuse of unopened electric vehicle batteries may comprise: a plurality of electric vehicle batteries; a plurality of control units, wherein each of the plurality of electric vehicle batteries is operably coupled to each of the plurality of control units and a central controller operably coupled to each of the plurality of control units. In various embodiments, the central controller is configured to: receive a signal from each of the plurality of control units; determine a status corresponding to each of the plurality of electric vehicle batteries based on the received signals; determine a desired use application for each of the plurality electric vehicle batteries based on each status corresponding to each of the plurality of electric vehicle batteries; determine an operating condition for each of the plurality of electric vehicle batteries based on each respective desired use application; and send, responsive to the determination of each of the operating conditions, a first control signal to each of the plurality of control units, wherein the first control signals cause each respective control unit of the plurality of control units to operate each respective electric vehicle battery of the plurality of electric vehicle batteries based on each respective desired operating condition.

In various embodiments, the plurality of electric vehicle batteries comprises a first electric vehicle battery and a second electric vehicle battery. In some embodiments, the plurality of control units comprises a first control unit and a second control unit, wherein the first vehicle battery is operably coupled to the first control unit and the second vehicle battery is operably coupled to the second control unit. In some embodiments, the central controller is further configured to: determine a first use application corresponding to the first electric vehicle battery and a second use application corresponding to the second electric vehicle battery; determine a first operating condition based on the first use application and a second operating condition based on the second use application; and send the first operating condition to the first control unit and the second operating condition to the second control unit. In various embodiments, the first operating condition corresponds to a first charge-discharge rate that is lower than a second charge-discharge rate corresponding to the second operating condition.

In various embodiments, the system may further comprise a bidirectional inverter coupled to the central controller, wherein the first operating condition requires DC power and the second operating condition requires AC power, wherein the central controller sends power from the second electric vehicle battery coupled to the second control unit operating under the second operating conditions to the inverter, and wherein the inverter converts power received from the second electric vehicle battery to AC power.

In various embodiments, the first use application corresponds to a delivery of power from the first electric vehicle battery to a coupled variable load and the second use application corresponds to a provision of power to the second electric vehicle battery from a coupled power supply. In various embodiments, the plurality of electric vehicle batteries comprises a first subset of electric vehicle batteries and a second subset of electric vehicle batteries. In some embodiments, the plurality of control units comprises a first subset of control units and second subset of control units. In some embodiments, each of the first subset of electric vehicle batteries is operably coupled to each of the first subset of control units, respectively, and each of the second subset of electric vehicle batteries is operably coupled to each of the second subset of control units, respectively. In some embodiments, the central controller comprises a first part and a second part, wherein the central controller is further configured to control the first subset of electric vehicle batteries via the first part and control the second subset of electric vehicle batteries via the second part.

The examples included for the disclosure are for clarification purposes only and a large number of other user cases could also be illustrated. The scope of the disclosure should not be limited to only include the user cases shown as examples.

Notwithstanding the embodiments described above in FIGS. 1-7, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A method for reusing an unopened electric vehicle battery within a second life battery system, the method comprising:
   receiving, by a central controller, a signal from a control unit coupled to the electric vehicle battery;
   processing, by a processor in communication with the central controller, the signal received from the control unit;
   determining, by the processor, a status of the electric vehicle battery based on the processed signal;
   determining, by the processor, a desired use application for the electric vehicle battery based on the status of the electric vehicle battery;
   determining, by the processor, an operating condition for the electric vehicle battery based on the desired use application; and
   sending, by the central controller, responsive to the determination of the operating condition, a first control signal to the control unit coupled to the electric vehicle battery;
   wherein the control signal causes the control unit to transition the electric vehicle battery from a discharge operation to a charge operation based on the desired use application.

2. The method of claim 1, further comprising sending, by the central controller, an activation signal to the electric vehicle battery via the control unit such that the electric vehicle battery is caused to change state.

3. The method of claim 1, wherein the status is based on a performance metric associated with the electric vehicle battery.

4. The method of claim 3, wherein the performance metric is based on a predetermined threshold corresponding to at least one of an impedance, efficiency, charge capacity, discharge capacity, voltage, or current associated with the electric vehicle battery.

5. The method of claim 1, further comprising:
   receiving, by the central controller, a load signal from a variable load coupled the central controller; and
   sending, by the central controller, a second control signal to the control unit coupled to the electric vehicle battery;
   wherein the second control signal causes the control unit to modify the operating condition of the electric vehicle battery.

6. The method of claim 1, further comprising:
   receiving, by the central controller, power from a coupled power source; and
   responsive to receiving power, deliver the power to the electric vehicle battery via the control unit.

7. A second life battery system enabling reuse of unopened electric vehicle batteries, the system comprising:
   an electric vehicle battery coupled to a control unit;
   a central controller operably coupled to the electric vehicle battery via the control unit;
   wherein the central controller is configured to:
      receive a signal from the control unit;

determine a status of the electric vehicle battery based on the received signal;

determine a desired use application for the electric vehicle battery based on the status of the electric vehicle battery;

determine an operating condition for the electric vehicle battery based on the desired use application; and send, responsive to the determination of the operating condition, a first control signal to the control unit;

wherein the first control signal causes the control unit to transition the electric vehicle battery from a discharge operation to a charge operation based on the desired use application.

8. The system of claim 7, wherein the central controller is further configured to send an activation signal to the electric vehicle battery via the control unit such that the electric vehicle battery is caused to change state.

9. The system of claim 7, wherein the status is based on a performance metric associated with the electric vehicle battery.

10. The system of claim 9, wherein the performance metric is based on a predetermined threshold corresponding to at least one of an impedance, efficiency, charge capacity, discharge capacity, voltage, or current associated with the electric vehicle battery.

11. The system of claim 7, wherein the central controller is further configured to:

receive a load signal from a variable load coupled the central controller; and send a second control signal to the control unit coupled to the electric vehicle battery;

wherein the second control signal causes the control unit to modify the operating condition of the electric vehicle battery.

12. The system of claim 7, wherein the central controller is further configured to:

receive power from a coupled power source; and responsive to receiving the power, deliver the power to the electric vehicle battery via the control unit.

13. The system of claim 7, further comprising a graphical user interface (GUI) in communication with the central controller, wherein the GUI is configured to receive an input from a user to alter the operating condition of the electric vehicle battery.

14. The system of claim 12, wherein the desired use application may determine whether the electric vehicle battery is configured for delivery of power to a coupled variable load or configured for receipt of power from the coupled power source.

15. A second life battery system enabling reuse of unopened electric vehicle batteries, the system comprising:

a plurality of electric vehicle batteries;

a plurality of control units;

wherein each of the plurality of electric vehicle batteries is operably coupled to each of the plurality of control units;

a central controller operably coupled to each of the plurality of control units, wherein the central controller is configured to:

receive a signal from each of the plurality of control units;

determine a status corresponding to each of the plurality of electric vehicle batteries based on the received signals;

determine a desired use application for each of the plurality electric vehicle batteries based on each status corresponding to each of the plurality of electric vehicle batteries;

determine an operating condition for each of the plurality of electric vehicle batteries based on each respective desired use application; and send, responsive to the determination of each of the operating conditions, a first control signal to each of the plurality of control units;

wherein the first control signals cause each respective control unit of the plurality of control units to operate each respective electric vehicle battery of the plurality of electric vehicle batteries based on each respective desired use application, wherein the first control signal causes a first control unit to transition a first electric vehicle battery from a discharge operation to a charge operation based on a first use application.

16. The system of claim 15, wherein the plurality of electric vehicle batteries comprises the first electric vehicle battery and a second electric vehicle battery;

wherein the plurality of control units comprises the first control unit and a second control unit;

wherein the first vehicle battery is operably coupled to the first control unit and the second vehicle battery is operably coupled to the second control unit; and wherein the central controller is further configured to:

determine the first use application corresponding to the first electric vehicle battery and a second use application corresponding to the second electric vehicle battery;

determine a first operating condition based on the first use application and a second operating condition based on the second use application; and send the first operating condition to the first control unit and the second operating condition to the second control unit.

17. The system of claim 16, wherein the first operating condition corresponds to a first charge-discharge rate that is lower than a second charge-discharge rate corresponding to the second operating condition.

18. The system of claim 16, further comprising:

a bidirectional inverter coupled to the central controller;

wherein the first operating condition requires DC power and the second operating condition requires AC power;

wherein the central controller sends power from the second electric vehicle battery coupled to the second control unit operating under the second operating conditions to the inverter; and wherein the inverter converts power received from the second electric vehicle battery to AC power.

19. The system of claim 16, wherein the first use application corresponds to a delivery of power from the first electric vehicle battery to a coupled variable load and the second use application corresponds to a provision of power to the second electric vehicle battery from a coupled power supply.

20. The system of claim 15, wherein the plurality of electric vehicle batteries comprises a first subset of electric vehicle batteries and a second subset of electric vehicle batteries;

wherein the plurality of control units comprises a first subset of control units and second subset of control units;

wherein each of the first subset of electric vehicle batteries is operably coupled to each of the first subset of control units, respectively, and each of the second subset of electric vehicle batteries is operably coupled to each of the second subset of control units, respectively;
wherein the central controller comprises a first part and a second part; and
wherein the central controller is further configured to:
control the first subset of electric vehicle batteries via the first part and control the second subset of electric vehicle batteries via the second part.

* * * * *

UNITED STATES PATENT AND TRADEMARK OFFICE
CERTIFICATE OF CORRECTION

| | | |
|---|---|---|
| PATENT NO. | : 12,334,521 B2 | Page 1 of 1 |
| APPLICATION NO. | : 17/580294 | |
| DATED | : June 17, 2025 | |
| INVENTOR(S) | : Trygve Burchardt | |

It is certified that error appears in the above-identified patent and that said Letters Patent is hereby corrected as shown below:

In the Specification

Column 1, Lines 7-10 should be replaced with the following:
--This application is a continuation of PCT/IB2020/056862 filed July 22, 2020, which claims the benefit of and priority to U.S. Patent Application No. 62/876,876, filed July 22, 2019, the entire disclosures of which are hereby incorporated by reference herein.--

Signed and Sealed this
Twenty-second Day of July, 2025

Coke Morgan Stewart
*Acting Director of the United States Patent and Trademark Office*